April 11, 1944.     I. CISSKI     2,346,291
METHOD OF MAKING FOCUSING LENS MOUNTS
Filed Oct. 4, 1940     3 Sheets-Sheet 3
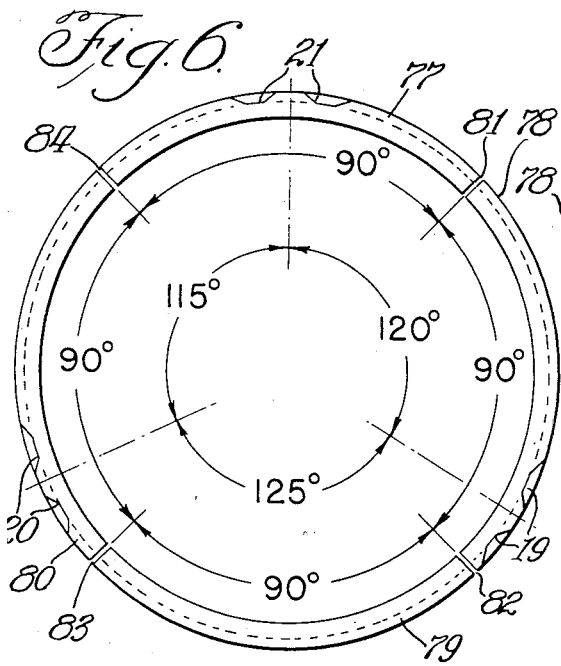
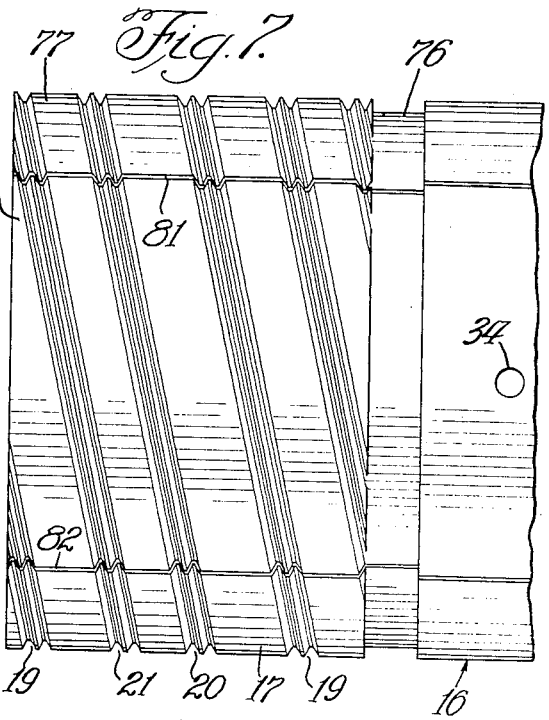
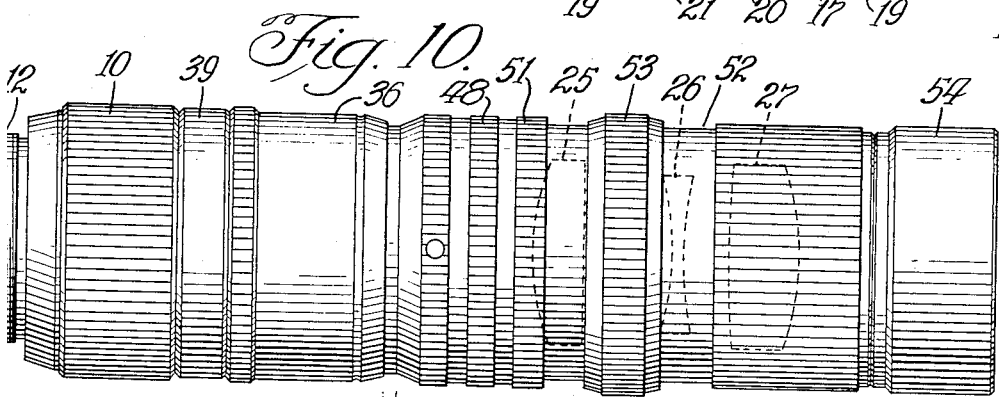
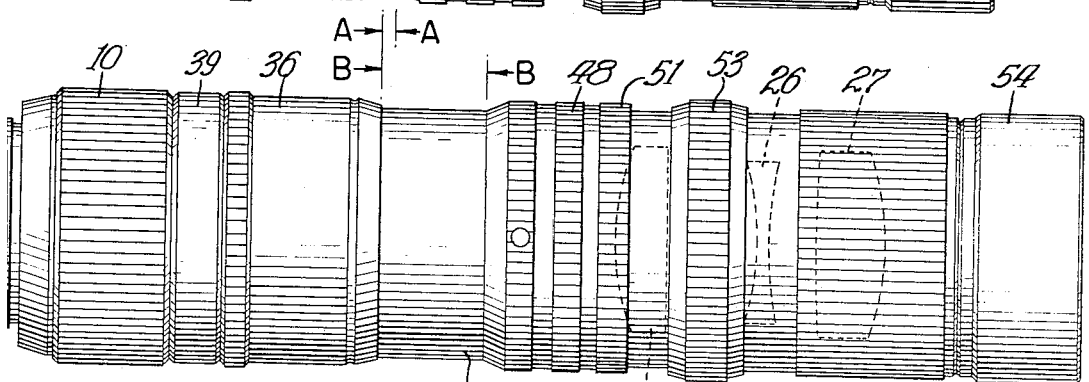
Inventor:
Irving Cisski
By: Robert F. Mishler, Att'y.

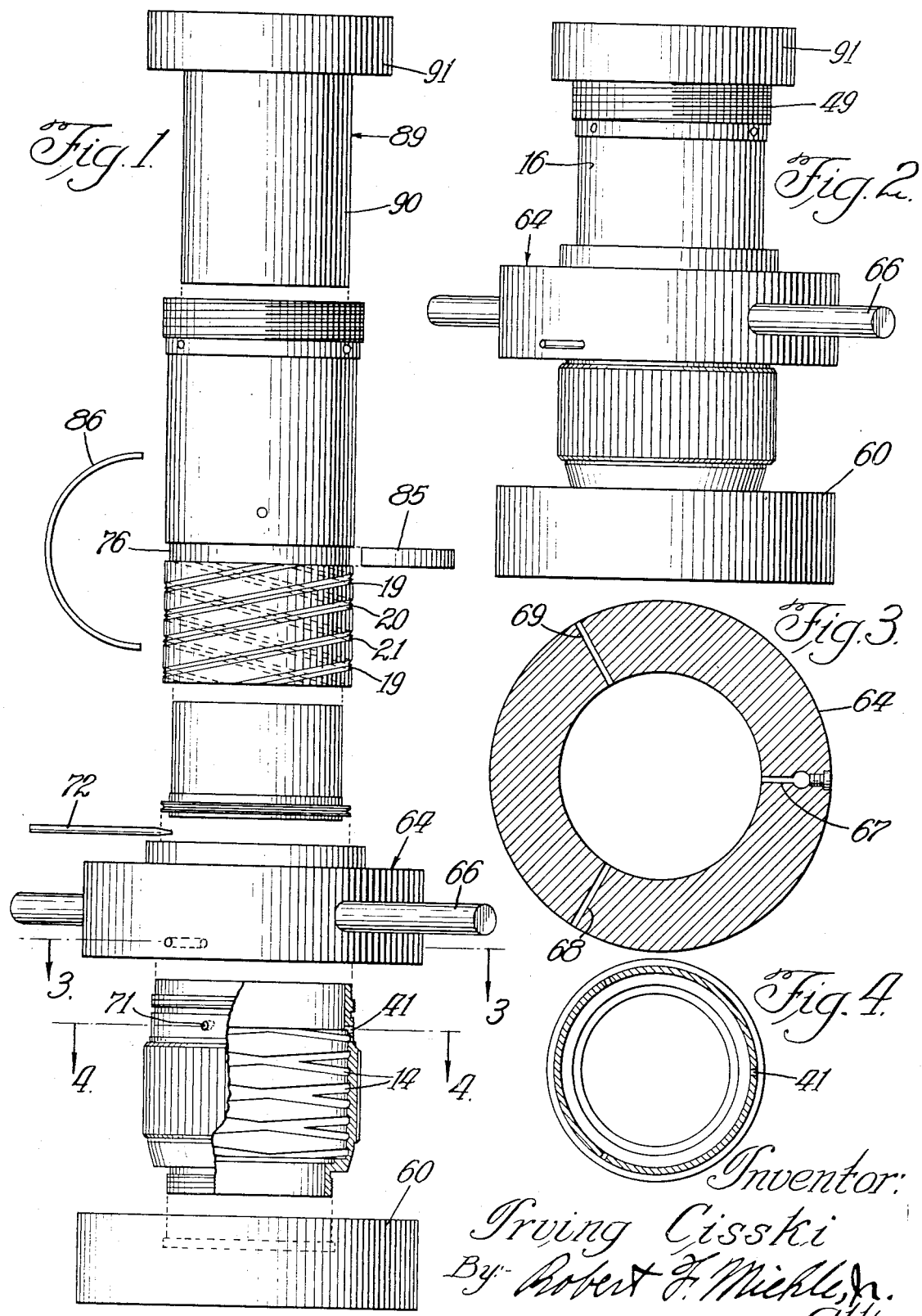

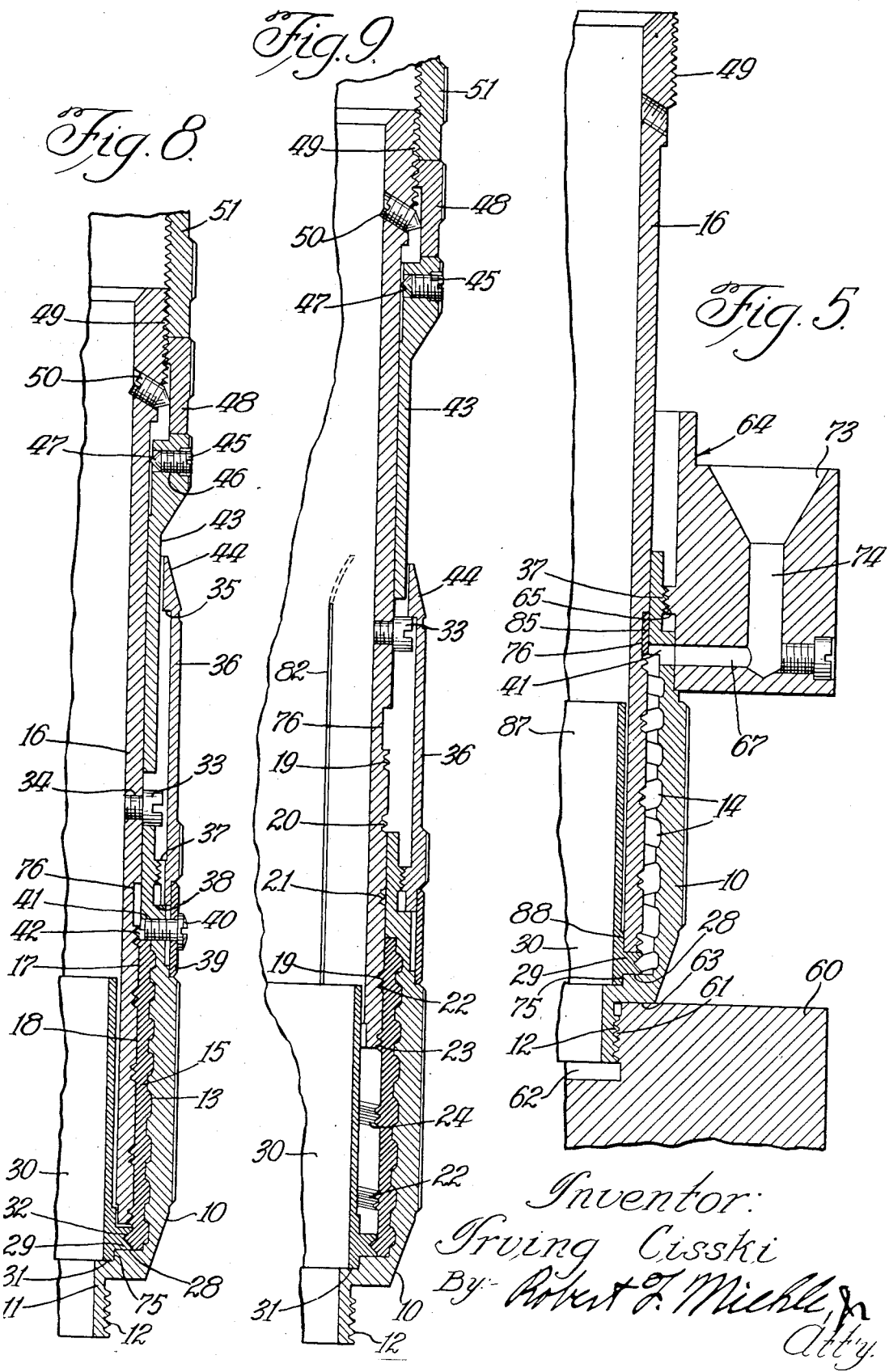

Patented Apr. 11, 1944

2,346,291

UNITED STATES PATENT OFFICE 2,346,291

METHOD OF MAKING FOCUSING LENS MOUNTS

Irving Cisski, Schiller Park, Ill., assignor to General Scientific Corporation, Chicago, Ill., a corporation of Illinois Application October 4, 1940, Serial No. 359,734

5 Claims. (Cl. 29—148.2)

My invention concerns a barrel in which the objective lens assembly for a camera or the like is to be mounted and relates more particularly to an improved method of making accurately fitting complemental bearing surfaces which are telescopically adjustable for varying the focus of such assembly.

One essential in a camera equipped with a large diameter objective lens, and being thus operable to take pictures at greater speed, is that the focusing shall be precise and that the beam of light transmitted thereby shall be directed exactly coaxially with the lens mount barrel. This requirement in the light control makes it imperative for the bearing surfaces upon the telescopically adjustable focusing parts within the barrel to be extremely accurate and has, therefore, resulted in numerous costly machining operations. The primary object of this invention is the provision of a new process involving a step in which one of the bearing surfaces of a lens mount sleeve or the equivalent is formed by casting or molding it against the bearing surface with which it coacts in the completely assembled device, to thus insure the desired precision of fit between these bearing surfaces and at a diminished production cost.

Another important object of the present invention is the provision of a novel casting process by means of which cooperative bearing surfaces upon adjustable lens mount sleeves are caused to possess a highly desirable character of frictional resistance to relative movement.

With these objects in view my invention consists in certain features of novelty in the construction, arrangement and manipulation of parts by means of which the said objects and certain other objects, hereinafter appearing, are effected, all as fully described with reference to the annexed drawings and more particularly pointed out in the appended claims.

In the drawings

Fig. 1 is a side elevational view of a plurality of lens mount parts, fabricatable into a lens barrel for a camera, together with auxiliary temporarily associatable parts employed in practicing the invention;

Fig. 2 is a side elevational view of the parts shown in Fig. 1 as they appear when assembled;

Fig. 3 is a transverse sectional view taken through a pouring and venting ring which is temporarily attachable to a lens mount sleeve to facilitate pouring of a solidifiable liquid therein for effecting a bearing surface therefor, the view being taken on the line 3—3 of Fig. 1;

Fig. 4 is a transverse sectional view through the lens mount sleeve which is to have the bearing surface formed therein, the view being taken on the line 4—4 of Fig. 1;

Fig. 5 is an enlarged fragmentary sectional view taken axially through a pair of lens mount sleeves and the aforesaid pouring and venting ring which is shown assembled with the sleeves for directing a solidifiable liquid into an annular space between said sleeves;

Fig. 6 is an end view of the innermost threaded sleeve of which a part is shown in Fig. 5, illustrating the circumferential spacing of a plurality of sets of threads thereon and the like spacing of slits therein;

Fig. 7 is a fragmentary side view illustrating the threaded and slitted portion of the sleeve shown in Fig. 6;

Fig. 8 is an enlarged fragmentary sectional view taken similarly to Fig. 5 but illustrating completely finished and assembled parts;

Fig. 9 is a view like Fig. 8, but showing the parts in their distended position;

Fig. 10 is a side view illustrating a complete lens mount barrel embodying the parts shown in Figs. 8 and 9, and illustrating said barrel in the telescopically collapsed position; and Fig. 11 is a view like Fig. 10, but illustrating the barrel in its distended position.

Referring now to the drawings and particularly to Figs. 8, 9, 10 and 11 thereof, a brief disclosure will first be given of the various sleeves, rings, and other parts constituting one form of lens mount barrel of which the construction is expedited and improved by using the present process as a part of the steps in its construction and fabrication.

An outer sleeve 10, preferably made of aluminum or an alloy thereof, has a base section 11 of reduced diameter which carries a threaded section 12 to provide means for its attachment to a camera housing or casing (not shown). The inner periphery 13 of the sleeve 10 is cylindrical or substantially so and is scored by a plurality of intersecting grooves 14, which are best illustrated in Fig. 1. These grooves 14 are adapted to have molded therein a cylindrical body 15 of bearing forming material, such as a babbitt alloy, which material is confined against the inner periphery of the sleeve 10 while molten and until such time of solidification upon being cooled. An inner sleeve 16, also made of an aluminum alloy, has an exterior bearing surface 17 of uniform diameter which is complemental with and slidable upon a bearing surface 18 of the body 15, said bearing surface 17 having screw-thread groove sets 19, 20, and 21 therein which respectively receive screw-thread sets 22, 23 and 24 upon the inner periphery of the bearing body 15. As will be fully explained hereinafter, the threads 22, 23 and 24 are formed by pouring the molten material, from which the bearing body 15 is formed, against the bearing surface 17 of the sleeve 16; that is, the solidifiable liquid from which the bearing body 15 is formed is poured into an annular space provided between the inner periphery 13 of the sleeve 10 and the bearing surface 17 of the sleeve 16 and subsequently caused to solidify as by cooling when it is a molten metal. This step of telescopically arranging the sleeves 10 and 16 with the inner periphery 13 and the bearing surface 17 in opposed spaced relation for effecting an annular space into which the solidifiable liquid for forming the bearing body 15 is poured constitutes a part of the present invention hereinafter described in detail.

Subsequently to the fabrication of the device, the sleeve 16 is adjustable axially with respect to the sleeve 10, and hence with respect to the camera case (not shown) with which the sleeve 10 is associated, by simply rotating the sleeve 16 relatively to the sleeve 10, said movement being caused by the intermeshed sets of thread grooves and threads as 19 and 22, and the direction of axial movement, of course, being determined by the direction in which the sleeve 16 is rotated. It is by means of this axial adjustment of the sleeve 16 that the focusing is effected for the objective lens system of which the lenses are illustrated in dotted outline at 25, 26 and 27 in Figs. 10 and 11.

Referring again to the sleeve 10, such sleeve will be seen to have an interior shoulder 28 adjacently to its lower end, which shoulder is adapted to have an annular flange 29 of a pilot sleeve 30 seated thereon. The lower end of the pilot member 30 is seated within the countersunk portion 31 of the sleeve 10 prior to the pouring of the molten material for forming the bearing body 15, and being thus centered with respect to the sleeve 10, said pilot member serves as a guide means for directing the sleeve 16 downwardly into the sleeve 10 and for maintaining said sleeves in spaced coaxial relation while the solidifiable liquid is poured and until it hardens. An annular groove 32 in the outer periphery of the flange 29 receives a portion of the liquid and is thus permanently held in association with the sleeve 10 subsequent to solidification of said liquid.

The upper end of the sleeve 10 is abuttable by and serves as a stop for the head of a set-screw 33 of which the threaded shank is screwed into an aperture 34 in the sleeve 16. Means for stopping axial movement of the sleeve 16 at the opposite limit of its axial movement is provided by an annular shoulder 35 within a sleeve 36 which is adjustably held to the upper end of the sleeve 10 by a threaded connection generally designated 37. Any spread incurred between the lower end of the adjustable stop sleeve 36 and a shoulder 38 of the sleeve 10 is concealed by a band or ring 39 which circumscribes the lens barrel and is held in position by four set-screws 40 of which the shanks are turned into angularly spaced threaded apertures 41 in said sleeve 10. Four holes 42 in the upper end of the bearing body 15 register with the threaded openings 41 for receiving the extreme end sections of the screws 40.

A scale (not shown) upon a scale sleeve 43 is cooperative with an indicator mark (not shown) upon the bevelled section 44 of the stop sleeve 36, this scale being calibrated in terms of focal length as is common practice in the art. Said sleeve 43 is selectively and firmly secured to the sleeve 16 by means of set-screws 45 which are meshed with threads in angularly spaced openings 46 in the sleeve 43 and which have points 47 adapted to be embedded in the sleeve 16.

A ring 48 which may be gripped by the fingers of the operator for rotating the sleeve 16 is advanced downwardly onto a threaded end section 49 of said sleeve, and is held non-rotatively in this advanced position by means of a set-screw 50. An interiorly threaded lens holding sleeve 51 is also advanced by means of its threads onto the threaded section 49 of said sleeve 16, and an additional lens holding sleeve 52 and an iris control ring 53, Figs. 10 and 11, are associated with the barrel in any conventional manner as well as a visor ring 54. When the quilled sleeve 48 is rotated to impart rotation in one direction to the sleeve 16, said sleeve 16 and the other parts of the lens barrel carried thereby may be advanced to the left as viewed in Fig. 10 to one limit of focal adjustment in which the collapsed telescopic condition is indicated by the spacing of the lines A—A, and when said sleeves 48 and 16 are likewise rotated, but in the opposite direction, the parts upon the sleeve 16 may be advanced to the right as viewed in Fig. 11 to the opposite limit of focal adjustment in which the distended telescopic condition is indicated by the spacing of the lines B—B.

Since the objective lens system consisting of the lenses 25, 26 and 27 is spaced a considerable axial distance from a photo-sensitive film or its equivalent within the camera casing (not shown), any misdirection by the lens system of the light through the barrel inwardly of the camera will be appreciably magnified. It follows that if a high speed lens is used the slightest looseness between the bearing surfaces as 17 and 18, or backlash between the meshed threads thereon, will result in a defective film exposure, wherefore it is imperative that said bearing surfaces be finished with a high degree of perfection. Heretofore this has been accomplished by performing meticulous machining operations upon these bearing surfaces. However, since such machining operations require the time of skilled technicians and of expensive machines the production costs have been high. The present casting process for effecting one of the complemental bearing surfaces constitutes a valuable expedient for obtaining a high degree of accuracy, and, at the same time, produces complemental bearing surfaces with a quality of uniform frictional resistance to relative rotation characteristic of a very fine instrument.

In practicing my invention, I first attach the sleeve 10 in an upright position upon a base member 60, Figs. 1, 2 and 5, by screwing the threads 12 into meshed relation with the threads 61 within a recess 62 of said base member. The threads 12 are advanced along the threads 61 until the face of a flat shoulder 63 upon the sleeve 10 is brought firmly into engagement with the upper face of said base member. Next, a pouring and venting ring 64, Figs. 1, 2, 3 and 5, will be carried into coaxial relation with the upper end of the sleeve 10 and advanced downwardly thereonto by rotating a threaded section 65 thereof onto the threaded section at 37 upon the sleeve 10. The ring 64 may be provided with a plurality of rods as 66, Figs. 1 and 2, which may be grasped as an aid in rotating the ring. Said ring 64 has three radially disposed channels or bores 67, 68 and 69, Fig. 3, which are equidistantly spaced circumferentially thereabout. Three openings, of which two, respectively designated 41 and 71, are visible in Fig. 1 and of which but one, the opening 41, is visible in Fig. 5, are arranged equidistantly about an upper end section of the sleeve 10. These openings as 41 and 71 are adapted to respectively register with the openings 67, 68 and 69 in the pouring and venting ring 64 when the latter is screwed into position upon the sleeve 10. An instrument such as a pin 72 is insertable through one of the ring openings as 69 and also through one of the openings as 71 in the upper end of the sleeve 10 when the ring 64 is rotated into the position for registering all of the openings as 67, 68 and 69 with their respective sleeve openings as 41 and 71. When this has been done, the instrument 72 will simply be retained in the axially aligned openings into which it has been inserted for maintaining this relation. The bore 67 of the ring 64 is connected with a funnel section 73 through a vertical passage 74 and communicates through the opening 41 with the interior of the sleeve 10.

Following the installation of the pouring and vent ring 64 as above described, the pilot sleeve 30 will be inserted downwardly into the base of the sleeve 10 and will be axially centered therein by the abutment of the outer peripheral section thereof below the flange 29 with a shoulder 75 upon the ring 10.

The bearing section 17 will be provided with sets as 19, 20 and 21 of screw-thread grooves as illustrated in Figs. 1, 6 and 7, and a groove 76 will be formed about said sleeve adjacently to the upper end of said bearing section. This groove 76 is for localizing distortion of the sleeve wall incident to radial deflection of quadrant sections 77, 78, 79 and 80 of said bearing section and which are formed subsequently to the casting or molding operation by the formation of slits 81, 82, 83 and 84 more particularly referred to hereinafter. After the sleeve has been dressed by the formation of the bearing surface 17, the screw-thread grooves as 19 and the circumferential groove as 76 thereon, said groove 76 is packed with a temporary filler comprising a pair of ring segments 85 and 86 which are illustrated in Fig. 1 where the segment 85 is shown in side elevation and the segment 86 in a plan view. With the ring segments 85 and 86 in place, the sleeve 16 will be lowered into the sleeve 10 into the position illustrated in Fig. 5, said sleeve 16 being first guided centrally of the sleeve 10 by an elongated upper part 87 of the sleeve 30 and finally into an exact center position with respect to the sleeve 10 by a shoulder portion 88. The lower end of the sleeve 16 ultimately rests upon the upper side of the flange 29. An annular space will then be formed between the inner periphery 13 of the sleeve 10 and the bearing surface 17 upon the sleeve 16. The lower end of this annular space is effectively closed by the lower end of the sleeve 10, the grooved outer periphery of the flange 29, and the lower end of the sleeve 16. As a final step in the setting up of the device and its auxiliaries preparatory to pouring the solidifiable liquid into said annular space, a weight member 89 will have the main body 90 thereof inserted downwardly through the upper end of the sleeve 16 where it is supported by means of its flange 91. The weight 89 simply serves as a mechanical stabilizer for the device during the pouring operation.

As the next step in the process, a solidifiable liquid such as a molten babbitt alloy will be poured into the funnel section 73 of the pouring and venting ring 64. The thus poured metal will descend through the bore 74 and pass laterally through the bore 67 and the opening 41 and thence downwardly into the annular space defined between the sleeves 10 and 16. As the poured metal rises within said annular space, venting takes place through the hole as 71 in the upper end of the sleeve 10 and the bore as 68, with which it is aligned in the pouring and venting ring 64, Fig. 3. When the annular space has been filled, the pouring will cease, and at this time the segmental rings 85 and 86 function to exclude any excess of the poured metal from filling the groove 76.

The poured metal is cooled to cause solidification thereof and subsequent to this, a tool (not shown) is applied to the sleeve 16 for rotating it relatively to the sleeve 10 and the body 15 of bearing forming material, such rotation taking place relatively to said body 15 since the scoring formed therein by the intersecting grooves 14 interlock said body and the sleeve 10 against relative movement. The bearing surface 17 as well as the screw-thread groove sets 19, 20 and 21 therein form a pattern which molds the inner periphery of said body 15 into the shape of the mating or complementally threaded bearing surface 18. Hence, when the sleeve 16 is rotated in the proper direction, the meshed threaded portions of the bearing surfaces 17 and 18 will cause the sleeve 16 to be advanced endwise upwardly and outwardly of the sleeve 10.

Following removal of the sleeve 16, the segmental filler ring pieces 85 and 86 will be taken from the groove 76, and a plurality of axial slits as said slits 81, 82, 83 and 84 will be made through the lower end portion only of said sleeve 16 and through the part thereof carrying its threaded bearing surface and sufficiently far to intersect and traverse the groove 76 as illustrated in Fig. 9 where the slit 82 is shown in part by means of a dotted line. The tongue-like quadrants as 77 defined between the slits as 82 are resiliently flexible which character adapts them to be sprung radially inwardly while reacting radially outwardly against the threaded bearing surface 18 (which diminishes slightly in diameter with the bearing body 15 when the latter solidifies and cools) when the sleeves 10 and 16 are reassembled. The flexing occurs at the parts of these quadrants which are weakened by the traversing groove 76 so that the resistance to contraction of the sleeve 16 at the bearing section 17, and hence the frictional resistance to relative rotation of the sleeves 10 and 16, is controllable by regulating the depth of said groove. Such gauging in depth of the groove 76, together with the precisely mated threaded bearing surfaces results in an exceptionally smooth action between these surfaces, and to insure that the surfaces will be assembled in their truly mated relation the sets of threads as 19 are unequally spaced circumferentially of the sleeve 16 as illustrated in Fig. 6 where it will be seen that the sets 19 and 20 are spaced 125 degrees whereas the sets 20 and 21 are spaced 115 degrees and the sets 21 and 19 are spaced 120 degrees.

While the above is a description of the preferred method of practicing my invention, it will be understood that many changes may be made therein without departing from the spirit thereof, but having thus described the invention I claim as new and desire to secure by Letters Patent, the following:

1. The method of making complementally threaded and mutually journalled inner and outer lens mount sleeves, comprising the steps of preparing a cylindrical bearing surface of uniform diameter upon a cylindrical periphery of one of such sleeves, effecting a plurality of screw-thread sets of like pitch upon said surface but spaced apart unequally circumferentially of said surface, disposing said sleeves in telescopic relation with said bearing surface in opposed spaced relation with a periphery of the other of said sleeves to provide an annular space between said bearing surface and the opposed periphery, placing a body of solidifiable liquid within said space, causing solidification of such body to effect thereon a threaded bearing surface mating with that on the one sleeve, relatively rotating said sleeves to separate the same by the action of the threaded bearing surfaces, and axially slitting a portion only of one of said sleeves through the part thereof carrying its threaded bearing surface to enable such surface to readily conform in diameter to the mating bearing surface when the sleeves are reassembled.

2. The method of preparing complementally threaded and mutually journalled inner and outer lens mount sleeves of which the inner sleeve has a threaded bearing surface of uniform diameter upon its outer periphery and terminating at one end thereof, comprising the step of vertically supporting the outer sleeve, centering a pilot sleeve within and adjacently to the lower end of the vertically arranged outer sleeve, lowering the inner sleeve into the outer sleeve with said end thereof lowermost to effect an annular space between said threaded bearing surface and the inner periphery of the outer sleeve and while centering said inner and outer sleeves by sliding the inner periphery of the inner sleeve over the outer periphery of the pilot sleeve, pouring a molten liquid body into said annular space, cooling said liquid body to solidify the same and thus effect thereon a threaded bearing surface mating with that on the inner sleeve, relatively rotating said inner and outer sleeves to separate the inner sleeve from the outer sleeve and from the pilot sleeve, axially slitting a portion only of the inner sleeve from its lower end through the part thereof carrying the threaded bearing surface to facilitate contraction of said bearing surface to the size of the bearing surface upon the solidified body when the sleeves are reassembled.

3. The method of preparing complementally threaded and mutually journalled inner and outer lens mount sleeves of which the inner sleeve has a threaded bearing surface of uniform diameter upon the outer periphery and terminating at one end thereof, comprising the step of effecting circumferentially spaced vent and gate openings adjacent to an end of the outer sleeve, vertically supporting said outer sleeve with said end disposed upwardly, inserting the inner sleeve with said end thereof lowermost into said outer sleeve and with said threaded bearing surface thereof in opposed spaced relation with the inner periphery of the outer sleeve to effect an annular space between said surface and the opposed inner periphery section, placing upon the outer periphery of the outer sleeve a ring having gate and vent bores respectively aligning with said gate and vent openings, pouring a molten low melting point bearing metal through said gate bore and opening into said annular space, cooling said metal to solidify the same and thus effecting upon the inner face of the body formed thereby a threaded bearing surface mating with that on the inner sleeve, relatively rotating said sleeves to separate the same by the coaction of said threaded bearing surfaces, and axially slitting a portion only of the inner sleeve from its lower end through the part thereof carrying the threaded bearing surface to facilitate contraction of said bearing surface to the size of the bearing surface upon the solidified body when the sleeves are reassembled.

4. The method of preparing inner and outer lens mount sleeves that are axially adjustable while sliding upon complemental cylindrical bearing surfaces respectively thereon, comprising the steps of providing one of said sleeves with its said cylindrical bearing surface and with helical screw threads directed about such surface at such a pitch that a substantial portion of said bearing surface obtains unmutilated between the convolutions of said threads, disposing said sleeves in telescopic relation with said bearing surface of the one sleeve in opposed spaced relation with a surface of the other sleeve to provide an annular space between said opposed surfaces, placing a solidifiable liquid material within said space in contact with both of said surfaces, causing solidification of the thus placed material to incur, upon the side thereof contiguous with said threaded bearing surface, the other of said bearing surfaces together with threads thereon meshed with the first named threads, relatively rotating said sleeves to separate the same by the action of the meshed threads, and axially slitting a portion only of one of said sleeves through the section thereof coinciding with its threaded bearing surface to facilitate variation in the diameter thereof.

5. The method of preparing inner and outer lens mount sleeves that are axially adjustable while sliding upon complemental bearing surfaces respectively thereon, comprising the steps of providing one of said sleeves with a cylindrical bearing surface upon one of its peripheries to constitute one of said complemental surfaces, threading said cylindrical bearing surface with helical screw threads directed thereabout at a pitch that a substantial portion thereof obtains unmutilated between the convolutions of said threads, circumscribing said sleeve with a groove at a section contiguous with said threads and disposed on the opposite side thereof from an end of said sleeve, disposing said sleeves in telescopic relation with said threaded bearing surface in opposed spaced relation with a cylindrical periphery of the other sleeve to effect an annular space between said bearing surface and said opposed periphery, placing a solidifiable body of liquid within said space in contact with said threaded bearing surface and the periphery opposed thereto, causing solidification of the thus placed body to effect thereon a threaded bearing surface mating with that on the one sleeve, relatively rotating said sleeves to separate the same by the action of the threads of said bearing surfaces, and axially slitting a portion only of said circumferentially grooved sleeve including said groove and said bearing surface, to facilitate adjustment in the diameter of such bearing surface and to enable the groove to localize the distortion of such sleeve attending such adjustment.

IRVING CISSKI.